Feb. 14, 1961     A. B. GOLDENTHAL     2,971,271

DISPLAY DEVICE

Filed Oct. 18, 1956

INVENTOR.
Allan B. Goldenthal
BY Harold D. Steinberg
atty.

United States Patent Office

2,971,271
Patented Feb. 14, 1961

2,971,271

DISPLAY DEVICE

Allan B. Goldenthal, Woodside, N.Y., assignor to William Douglas McAdams, Inc., New York, N.Y., a corporation of New York Filed Oct. 18, 1956, Ser. No. 616,689

3 Claims. (Cl. 35—17)

This invention relates to a display device and more particularly to a display device for demonstrating inner parts of a physical structure by means of exchangeable slides.

Even more particularly, the present invention relates to a display device for displaying the inner organs of a human body.

It is one object of the present invention to provide a display device simulating a physical structure, and in which different parts of the physical structure can be demonstrated by exchangeable slides carrying images of such inner parts.

Another object of the present invention is to provide a display device simulating a human body, in which various inner organs of the human body may be illustrated by exchangeable slides carrying pictures of such inner organs.

Another object of the present invention is to provide a display device, which may be used by physicians, in classrooms, and for commercial displays for the purpose of demonstrating the inner anatomy of the human and animal body both male and female.

Another object of the present invention is to provide a display device which, by means of exchangeable slides, is capable of demonstrating progressive pathological conditions within the human body, as well as the different phases of pregnancy or normal human development.

Another object of the present invention is to provide a display device for demonstarting by means of exchangeable slides the skeleton structure, the nervous system, the vascular and arterial blood system and transverse sections of the inner organs of a human body.

With these objects in view, the present invention mainly consists in a display device which comprises, in combination, a three-dimensional body substantially conforming in shape to at least a portion of a physical structure, the body being formed with at least one slot, and at least a portion of the body being transparent and bounding the slot at one side thereof; and at least one exchangeable slide means adapted to carry an image of at least a part of the physical structure, the slide means being removably mounted in the slot so that the above mentioned part of the physical srtucture appears to be located within the three-dimensional transparent body when the image is viewed through this transparent portion.

According to a preferred embodiment of the present invention, the entire body is transparent, so that the slide means may be viewed from any direction.

In order to create an even more lifelike effect, the slide means preferably includes a transparent sheet the same outline as the transparent body, and a non-transparent picture on the transparent sheet depicting a part of the physical structure which is represented by the three-dimensional transparent body.

In a preferred embodiment of the present invention, the three-dimensional transparent body has the shape of a human body, and various anatomical systems, such as the nervous system, the arterial blood system, the skeleton, and etc., are shown on a set of exchangeable slides which may be selectively placed in the slot of the three-dimensional transparent body.

The set slides may also be used for illustrating consecutive phases of pregnancy, or consecutive pathological conditions.

The slot may be provided in the transparent body in such a manner that the inserted slide illustrates a front view of the inner organs, or transverse thereto so that the slide illustrates a side view of the inner organs. It is also contemplated to provide the transparent body with two transverse slots so that both types of slides may be used with one transparent body. This embodiment of the present invention may also be used with a slide means having two crossing slides permitting illustration of inner parts in a front view and a side view.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
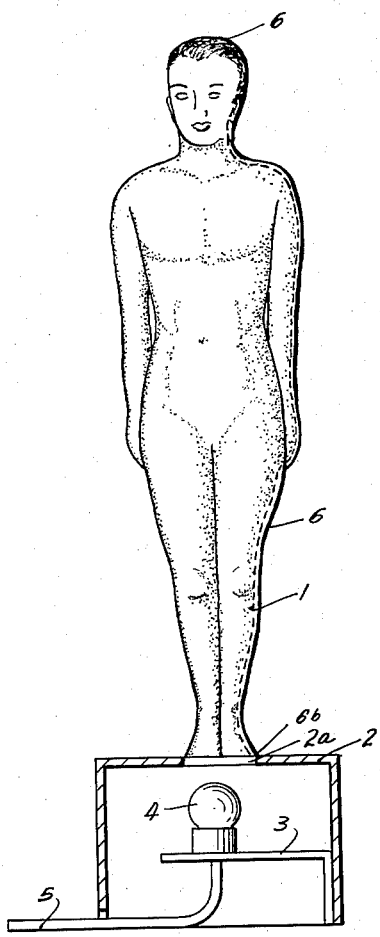
Fig. 1 is a front view of a display device according to the preferred embodiment of the present invention, partly shown in the sectional view.
Figure 2:
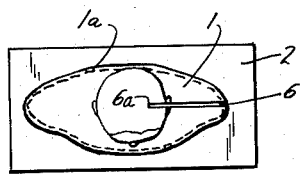
Fig. 2 is a plan view of the display device illustrated in Fig. 1.

Referring now to the drawings, and more particularly to Figs. 1 and 2, a three-dimensional transparent body conforming in shape to a human body, or to any other physical structure, is supported on a base to which is hollow and houses a bracket 3 on which a source light 4 is mounted. The source of light 4 is shown to be an electric bulb with wires 5 which may be plugged into a wall outlet. Instead of the cord 5, batteries may be arranged in the hollow base 2 for supplying a voltage to the electric lamp 4. A suitable slot 2a is provided in the top wall of the base 2 so that the light from the lamp 4 illuminates the transparent body 1.

In the illustrated embodiment, the transparent body 1 is hollow and includes transparent walls 1a best seen in Fig. 2. The transparent wall 1a is provided with a slot 6 which extends at one side of the body 1 between the point 6a and the point 6b.

Figure 3:
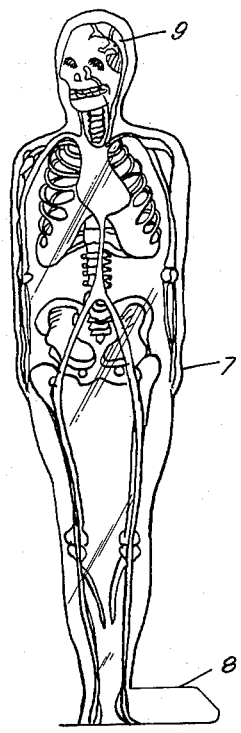
Fig. 3 is a front view of a slide used with the embodiment of Fig. 1.
Figure 4:
Fig. 4 is a plan view of the slide illustrated in Fig. 3.

A slide means is illustrated in Figs. 3 and 4 which is to be inserted into these slots 6. The slide means includes a slide consisting of a transparent sheet 7 and a handle portion 8. When the slide means 7, 8 is inserted into the slot 6, the slide 7 is completely located in the transparent body 1, and since the outline of the slide 7 conforms to the outline of the transparent body in the plane of the slot 6, only the handle portion 8 projects from the slot 6. A layer of a non-transparent material 9 is applied to the sheet 7 to form an image. It will be understood that the layer may be a photographic emulsion layer, or a layer consisting of paint which may be translucent or opaque. In Fig. 3, the layer of non-transparent material 9 is schematically shown to illustrate the bone structure of a human being, but as pointed out above any other part of the anatomy of the human body may be illustrated on various slides 7, 8 which are selected by the demonstrating operator, and inserted into the transparent body 1.

Since the non-transparent layer 9 is clearly visible through the transparent body 1, whereas the transparent sheet 7 is not, the illusion is created that the organs depicted by the non-transparent layer 9, located within the three-dimensional body 1 and form part thereof.

Such illusion is even improved, if the non-transparent picture 9 is illuminated by the electric lamp 4, although daylight passing through the transparent body 1 will create almost the same effect.

Figure 5:
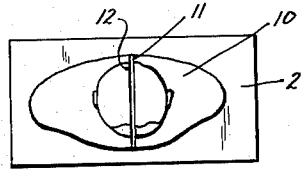
Fig. 5 is a plan view of a modified embodiment of the present invention.

In the embodiment of Fig. 5 a transparent body 10 is shown whose front view substantially corresponds to the front view of Fig. 1. However, in the embodiment of Fig. 5 the transparent body is assumed to be solid, and provided with a slot 11 which extends in a plane of symmetry between the rear and the front of the transparent statue. A slide 12 is shown to be located in the slot 11 and to have an outline conforming to the outline of the transparent body 10 in a section taken in the plane of the slot 11. The slide 12 is provided with the image of an inner part of the physical structure which is represented by the transparent body 10.

Figure 6:
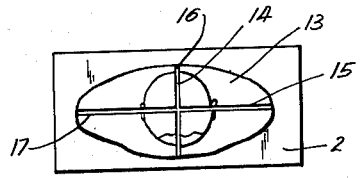
Fig. 6 is a plan view of another modified embodiment of the present invention.

In the embodiment of Fig. 6, the transparent body 13 is mounted on a base 2, and provided with two crossing slots 14 and 15. A slide means composed of two crossing slides 16 and 17 is shown inserted into the slots 14 and 15. In accordance with the present invention, these slides 16 and 17 are respectively provided with images representing side views and front views of the inner organs of the human body represented by the transparent body 13.

It will be understood, that a transparent body provided with crossing slots 14 and 15 as shown in Fig. 6, may also be used with a slide 7 as illustrated in Figs. 3 and 4, or with a slide 12 as illustrated in Fig. 5. If these slides are used in connection with the transparent body 13 shown in Fig. 6, one of the two slots 14 and 15 is not used. Thereby it is possible to selectively show front views or side views of the inner anatomy of the human body.

While the embodiment illustrated in the drawings show a transparent body representing a human figure, it will be understood that the transparent body may also be used for representing a portion, or the whole of any anatomical structure, such as an animal, or a machine. Animal figures may be advantageously used by veterinarians, and models of machines will be very useful for educative or demonstrative purposes.

It is to be understood that where the word "transparent" is used in the specifications and claims, what is meant is, such a degree of transparency that the image on the slide inserted into the transparent body is visible by an observer from outside of the transparent body.

It will be understood that each of the elements described above, or two or more together, may also find a useful application in other types of display devices differing from the types described above.

While the invention has been illustrated and described as embodied in a display device including a transparent body and an exchangeable slide located in the transparent body and carrying the picture of an element which appears to be located within the transparent body when viewed from the outside, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A display device comprising, in combination, a three-dimensional transparent body substantially conforming in shape to at least a portion of a physical structure, said three-dimensional transparent body being formed with a pair of slots located in planes perpendicular to each other; and an exchangeable slide means including a pair of crossing slides adapted to carry images of at least a part of said portion of said physical structure, said crossing slides being removably mounted in said slots so that said part of said physical structure appears to be located in said three-dimensional transparent body when said images are viewed through said transparent body.

2. A display device comprising, in combination, a three-dimensional transparent body substantially conforming in shape to at least a portion of a physical structure, said three-dimensional transparent body being formed with a pair of slots located in planes perpendicular to each other; and at least one exchangeable slide means being removably mounted in at least one of said slots so that said part of said physical structure appears to be located in said three-dimensional transparent body when said images are viewed through said transparent body.

3. A display device comprising, in combination, a three-dimensional transparent body substantially conforming in shape to at least a portion of a physical structure, said three-dimensional transparent body being formed with a pair of slots located in planes perpendicular to each other; and an exchangeable slide means including a pair of crossing slides adapted to carry images of at least a part of said portion of said physical structure, said crossing slides being removably mounted in said slots, each of said slides having an outline conforming to the outline of said body in the region of the respective slot associated with the respective slide, so that said part of said physical structure appears to be located in said three-dimensional transparent body when said images are viewed through said transparent body.

References Cited in the file of this patent

UNITED STATES PATENTS

| | | |
|---|---|---|
| 1,873,748 | Favreau | Aug. 23, 1932 |
| 2,158,906 | Netter | May 16, 1939 |
| 2,472,114 | Marder | June 7, 1949 |
| 2,588,545 | Lawrence | Mar. 11, 1952 |

FOREIGN PATENTS

| | | |
|---|---|---|
| 642,510 | France | May 7, 1928 |
| 784,745 | France | May 6, 1935 |
| 819,517 | France | July 12, 1937 |